United States Patent [19]
Phelps

[11] Patent Number: 5,564,212
[45] Date of Patent: Oct. 15, 1996

[54] FISHING ROD WRAPPING DEVICE NEEDLE

[76] Inventor: Don R. Phelps, 1514 Roosevelt, Joplin, Mo. 64801

[21] Appl. No.: 489,147

[22] Filed: Jun. 9, 1995

[51] Int. Cl.⁶ .................................................. A01K 87/06
[52] U.S. Cl. ........................................................ 43/4; 43/1
[58] Field of Search ................................ 43/1, 4; 289/17, 289/1.2, 18.1; 112/224, 225

[56] References Cited

U.S. PATENT DOCUMENTS

| | | | |
|---|---|---|---|
| 2,561,502 | 7/1951 | Diemer | 112/224 |
| 3,448,506 | 6/1969 | Bishop et al. | 289/18.1 |
| 3,581,688 | 6/1971 | Ketterer | 112/224 |
| 3,699,911 | 10/1972 | Ketterer | 112/224 |
| 4,442,981 | 4/1984 | Cope | 43/1 |
| 4,510,653 | 4/1985 | Semanko | 289/17 |
| 4,539,923 | 9/1985 | Long | 112/224 |
| 4,593,447 | 6/1986 | Tupper | 43/1 |
| 5,020,833 | 6/1991 | Wardall | 289/17 |

*Primary Examiner*—Joseph J. Hail, III
*Assistant Examiner*—Darren Ark
*Attorney, Agent, or Firm*—Richard L. Miller, P.E.

[57] ABSTRACT

A self threading fishing rod needle wrapping device that includes a body portion, a jaw blade major projection, a jaw blade major projection paw, and a jaw blade minor projection paw. The jaw blade major projection extends smoothly from and is collinear with the body portion. The jaw blade major projection has a jaw blade major projection inner surface with a jaw blade major projection inner surface intermediate position. The jaw blade minor projection extends smoothly from and is collinear with the body portion. The jaw blade minor projection has a jaw blade minor projection inner surface with a jaw blade minor projection inner surface intermediate position. The jaw blade minor projection is disposed a distance from and substantially parallel to the jaw blade major projection and defines a jaw blade slot therebetween. The jaw blade major projection paw is disposed on and projects outwardly from the jaw blade major projection inner surface intermediated position. The jaw blade minor projection paw is disposed on and projects outwardly from the jaw blade minor projection inner surface intermediate position and towards the jaw blade major projection paw. The jaw blade major projection and the jaw blade minor projection is reversely movable from a first position where the jaw blade minor projection paw contacts the jaw blade major projection paw to a second position where the jaw blade minor projection paw does not contact the jaw blade major projection.

3 Claims, 1 Drawing Sheet

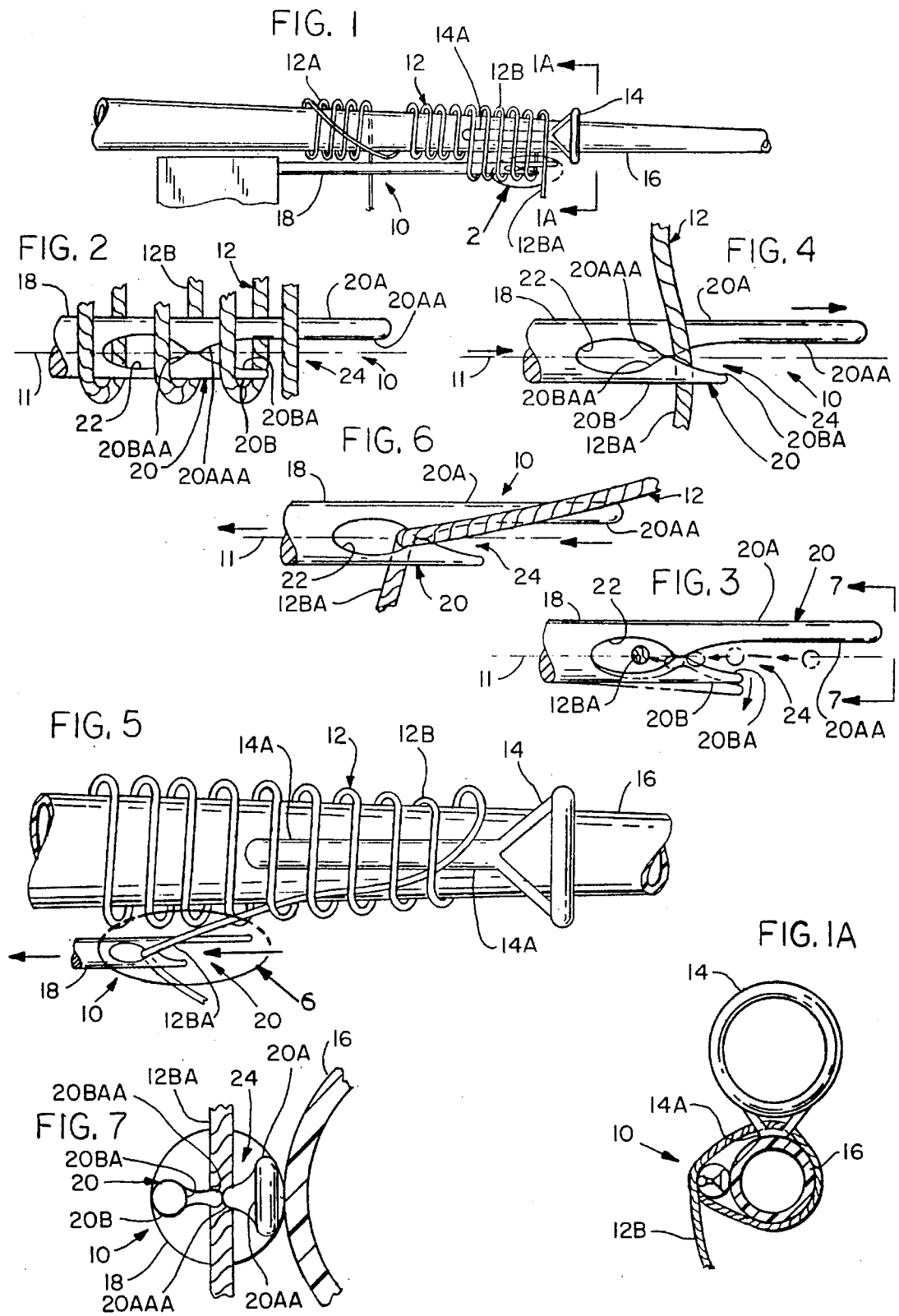

FISHING ROD WRAPPING DEVICE NEEDLE

BACKGROUND OF THE INVENTION

The present invention relates to a fishing rod wrapping device needle. More particularly, the present invention relates to a fishing rod wrapping device needle that permits the thread to be captured from an end insertion type maneuver.

Presently, a wrapping thread initial portion is wrapped around the fishing rod at the position adjacent to where the eyelet base is to be placed. The eyelet base is then positioned on the fishing rod and subsequent thereto a separate piece of looped wrapping thread is positioned adjacent to the fishing rod in the area of the eyelet base.

The wrapping thread remaining portion is then wrapped around both the positioned eyelet base and the separate looped piece of wrapping thread. The wrapping thread remaining portion end is slid through the loop of the separate looped piece of wrapping thread.

The separate looped piece of wrapping thread is then moved in the direction opposite to where the eyelet is positioned. This movement causes the separate looped piece of wrapping thread to escape from the wrapping thread remaining portion while pulling the wrapping thread remaining portion end between the fishing rod and the wrapping thread remaining portion. The wrapping thread end is then removed from the separate looped piece of wrapping thread and pulled to securely fasten the eyelet to the fishing rod.

Numerous innovations for self threading needles have been provided in the prior art that will be described. However, even though these innovations may be suitable for the specific individual purposes to which they address, they differ from the present invention in that their use is solely for sewing machines.

For example, U.S. Pat. No. 3,581,688 to Ketterer teaches a self-threading sewing machine needle whose pointed extremity is formed with a slot that extends upwardly into the bottom of the needle eye and defines a minor point at one side of and above the main needle point. The slot is non-planar in transverse configuration and provides a concave recess into the side of the main needle point into which recess the minor point is bent.

Another example, U.S. Pat. No. 3,699,911 also to Ketterer teaches a self-threading sewing machine needle that has a threading slot provided along the needle blade which opens into the needle eye. The needle eye is so constructed that reentry of the tread into the threading slot is deterred once the thread has been drawn into the needle eye.

Finally, another example, U.S. Pat. No. 4,539,923 to Long teaches a self-threading sewing machine needle that has a threading slot entering onto the upper portion of the needle eye at approximately two thirds from the bottom of the eye. Further included is a point offset relative to the axis of elongation of the needle toward the same side of the needle which enters the slot enters the eye. The slot lies in a plane substantially normal to the axis of the needle in which the slot is formed. The needle includes a clearance above the eye and a thread accommodating groove.

It is apparent that numerous innovations for self threading sewing machine needles have been provided in the prior art that are adapted to be used. Furthermore, even though these innovations may be suitable for the specific individual purposes to which they address, they would not be suitable for the purposes of the present invention as heretofore described.

SUMMARY OF THE INVENTION

Accordingly it is an object of the present invention to provide a fishing rod wrapping device needle that avoids the disadvantages of the prior art.

It is another object of the present invention to provide a fishing rod wrapping device needle that is simple and inexpensive to manufacture.

Still another object of the present invention is to provide a fishing rod wrapping device needle that is simple to use.

Yet another object of the present invention is to provide a fishing rod wrapping device needle that includes a body portion, a jaw blade major projection, a jaw blade major projection paw, and a jaw blade minor projection paw.

Still yet another object of the present invention is to provide a fishing rod wrapping device needle wherein the jaw blade major projection extends smoothly from and is collinear with the body portion.

Yet still another object of the present invention is to provide a fishing rod wrapping device needle wherein the jaw blade major projection has a jaw blade major projection inner surface with a jaw blade major projection inner surface intermediate position.

Still yet another object of the present invention is to provide a fishing rod wrapping device needle wherein the jaw blade minor projection extends smoothly from and is collinear with the body portion.

Yet still another object of the present invention is to provide a fishing rod wrapping device needle wherein the jaw blade minor projection has a jaw blade minor projection inner surface with a jaw blade minor projection inner surface intermediate position.

Still yet another object of the present invention is to provide a fishing rod wrapping device needle wherein the jaw blade minor projection is disposed a distance from and substantially parallel to the jaw blade major projection and defines a jaw blade slot therebetween.

Yet still another object of the present invention is to provide a fishing rod wrapping device needle wherein the jaw blade mayor projection paw is disposed on and projects outwardly from the jaw blade major projection inner surface intermediated position.

Still yet another object of the present invention is to provide a fishing rod wrapping device needle wherein the jaw blade minor projection paw is disposed on and projects outwardly from the jaw blade minor projection inner surface intermediate position and towards the jaw blade major projection paw.

Yet still another object of the present invention is to provide a fishing rod wrapping device needle wherein the jaw blade major projection and the jaw blade minor projection are reversely movable from a first position where the jaw blade minor projection paw contacts the jaw blade major projection paw to a second position where the jaw blade minor projection paw does not contact the jaw blade major projection paw.

Still yet another object of the present invention is to provide a fishing rod wrapping device needle wherein the jaw blade major projection is longer than the jaw blade minor projection.

Yet still another object of the present invention is to provide a fishing rod wrapping device needle wherein the jaw blade major projection is resilient.

Still yet another object of the present invention is to provide a fishing rod wrapping device needle wherein the jaw blade minor projection is resilient.

Yet still another object of the present invention is to provide a fishing rod wrapping device needle wherein the needle eye is substantially oval shaped.

Still yet another object of the present invention is to provide a fishing rod wrapping device needle wherein the first position divides the jaw blade slot into a needle eye and a jaw blade thread slot.

Yet still another object of the present invention is to provide a fishing rod wrapping device needle wherein the needle eye is substantially oval shaped.

Still yet another object of the present invention is to provide a fishing rod wrapping device needle wherein the jaw blade thread slot tapers smoothly towards the needle eye.

Yet still another object of the present invention is to provide a fishing rod wrapping device needle wherein the body portion is substantially rod shaped.

Still yet another object of the present invention is to provide a method for utilizing a fishing rod wrapping device needle that includes the steps of wrapping a thread initial portion of a thread around a fishing rod at a position adjacent to where an eyelet base of an eyelet is to be placed, positioning the eyelet base on the fishing rod, positioning the fishing rod wrapping needle device adjacent to the fishing rod with the jaw blade assembly positioned in the area of the eyelet base, wrapping a thread remaining portion of the thread around both the eyelet base and the jaw blade assembly, sliding a thread remaining portion end of the thread remaining portion inwardly along the jaw blade slot to the junction of the jaw blade assembly major projection inner surface paw and the jaw blade assembly minor projection inner surface paw, urging the thread remaining portion end towards the needle eye, forcing the jaw blade assembly major projection inner surface paw and the jaw blade assembly minor projection inner surface paw to separate from each other, positioning the thread remaining portion end within the needle eye, moving the fishing rod wrapping needle device in a direction opposite to where the eyelet base is positioned, allowing the fishing rod wrapping device needle to escape from the thread remaining portion, pulling the thread remaining portion end between the fishing rod and the wrapping thread remaining portion, removing the thread remaining end from the needle eye, and pulling the thread remaining end to securely fasten the eyelet to the fishing rod.

Yet still another object of the present invention is to provide a method for utilizing a fishing rod wrapping device wherein the sliding step is facilitated by the presence of smoothly tapering sides that taper to a substantially concave surface.

Finally, another object of the present invention is to provide a method for utilizing a fishing rod wrapping device needle wherein the forcing step is facilitated by the resiliency of the jaw blade assembly.

The novel features which are considered characteristic of the present invention are set forth in the appended claims. The invention itself, however, both as to its construction and its method of operation, together with additional and advantages thereof, will be best understood from the following description of the preferred embodiment when read and understood in conjunction with the accompanying drawing.

BRIEF DESCRIPTION OF THE DRAWING

FIG. 1 is a diagrammatic plan view showing how the needle device of the instant invention cooperates with a fishing pole blank to secure the wrapping thread, that has been applied thereto;

FIG. 1A is a diagrammatic cross sectional view taken on line 1A of FIG. 1;

FIG. 2 is an enlarged view of the area in the dotted curve indicated by arrow 2 in FIG. 1 showing the needle device in greater detail;

FIG. 3 is an enlarged view of the needle device diagrammatically illustrating the thread being drawn through the jaws into the eye;

FIG. 4 is an enlarged diagrammatic partial side view of the needle illustrating the wrapping thread about to be drawn through the jaws into the needle eye;

FIG. 5 is an enlarged diagrammatic plan view showing the fishing pole blank after the needle device has secured the wrapping thread thereto;

FIG. 6 is an enlarged view of the area in the dotted curve indicated by arrow 6 in FIG. 5 showing the needle device in greater detail; and FIG. 7 is an enlarged diagrammatic view taken on line 7—7 of FIG. 3 with a piece of the cooperating fishing pole blank shown in cross section.

LIST OF REFERENCE NUMERALS UTILIZED IN THE DRAWING

10—fishing rod wrapping device needle

11—longitudinal axis

12—wrapping thread

12A—wrapping thread initial portion

12B—wrapping thread remaining portion

12BA—wrapping thread remaining portion end

14—eyelet

14A—eyelet base

16—fishing rod

18—body portion

20—jaw blade assembly

20A—jaw blade assembly major projection

20AA—jaw blade assembly major projection inner surface

20AAA—jaw blade assembly major projection inner surface paw

20B—jaw blade assembly minor projection

20BA—jaw blade assembly minor projection inner surface

20BAA—jaw blade assembly minor projection inner surface paw

22—needle eye

24—slot

DETAILED DESCRIPTION OF THE PREFERRED EMBODIMENT

Referring now to the figures in which like numerals indicate like parts, and particularly to FIGS. 1 and 1A, the fishing rod wrapping device needle of the present invention is shown generally at 10 preparing to receive wrapping thread 12 used to secure the eyelet base 14A of an eyelet 14 to a fishing pole 16. The wrapping thread 12 has a wrapping thread initial portion 12A and a wrapping thread remaining portion 12B that has a wrapping thread remaining portion end 12BA.

The configuration of the fishing rod wrapping device needle 10 can best be seen in FIGS. 2–4, 6 and 7, and as such, will be discussed with reference thereto.

The fishing rod wrapping device needle 10 includes a longitudinal axis 11, a body portion 18 which is elongated and substantially cylindrical in shape, but is not limited to that, and a resilient jaw blade assembly 20 that extends smoothly therefrom.

The resilient jaw blade assembly 20 includes a resilient jaw blade assembly major projection 20A with a resilient jaw blade assembly major projection inner surface 20AA and a jaw blade assembly minor projection 20B with a jaw blade assembly minor projection inner surface 20BA that is substantially parallel to the jaw blade assembly minor projection 20B. As can be seen the jaw blade assembly major projection 20A is substantially greater in length than that of the jaw blade assembly minor projection 20B.

A jaw blade assembly major projection inner surface paw 20AAA is disposed at an intermediate position on the jaw blade assembly major projection inner surface 20AA and a jaw blade assembly minor projection inner surface paw 20BAA is disposed at an intermediate position on the jaw blade assembly major projection inner surface 20BA.

The jaw blade assembly major projection inner surface paw 20AAA in conjunction with the jaw blade assembly minor projection inner surface paw 20BAA divide the jaw blade assembly 20 into a needle eye 22 and a needle slot 24. The needle eye 22 is substantially oval in shape. The needle slot 24 is disposed in the direction of the longitudinal axis 11 of the jaw blade assembly 20 and is defined by sides that flow smoothly towards the jaw blade assembly major projection inner surface paw 20AAA and the jaw blade assembly minor projection inner surface paw 20BAA and forming a substantially concave surface therewith.

The method for manually or automatically utilizing the fishing rod wrapping needle device 10 can best be seen in FIGS. 2–6, and as such, will be discussed with reference thereto.

The wrapping thread initial portion 12A is wrapped around the fishing rod 16 at the position adjacent to where the eyelet base 14A is to be placed. The eyelet base 14A is then positioned on the fishing rod 16 and subsequent thereto the fishing rod wrapping device needle 10 is positioned adjacent to the fishing rod 16 with the jaw blade assembly 20 positioned in the area of the eyelet base 14A.

The wrapping thread remaining portion 12B is then wrapped around both the positioned eyelet base 14A and the jaw blade assembly 20. The wrapping thread remaining portion end 12BA is slid inward along the slot 24 to the junction of the jaw blade assembly major projection inner surface paw 20AAA and the jaw blade assembly minor projection inner surface paw 20BAA. This action is facilitated by the presence of the smooth sides and the concave surface of the slot 24.

The wrapping thread remaining portion end 12BA is urged towards the needle eye 22 forcing the jaw blade assembly major projection inner surface paw 20AAA and the jaw blade assembly minor projection inner surface paw 20BAA to separate from each other. The resiliency of the jaw blade assembly 20 allows this to occur. The wrapping thread remaining portion end 12BA is now positioned within the needle eye 22.

The fishing rod wrapping device needle 10 is then moved in the direction opposite to where the eyelet 14 is positioned. This movement causes the fishing rod wrapping device needle 10 to escape from the wrapping thread remaining portion 12B while pulling the wrapping thread remaining portion end 12BA between the fishing rod 16 and the wrapping thread remaining portion 12B. The wrapping thread end 12BA is then removed from the needle eye 22 and pulled to securely fasten the eyelet 14 to the fishing rod 16.

It will be understood that each of the elements described above, or two or more together, may also find a useful application in other types of constructions differing from the types described above.

While the invention has been illustrated and described as embodied in a fishing rod wrapping device needle, it is not intended to be limited to the details shown, since it will be understood that various omissions, substitutions and changes in the forms and details of the device illustrated and in its operation can be made by those skilled in the art without departing in any way from the spirit of the present invention.

Without further analysis, the foregoing will so fully reveal the gist of the invention that others can, by applying current knowledge, readily adapt it for various applications without omitting features that, from the standpoint of prior art, fairly constitute characteristics of the generic or specific aspects of this invention.

What is claimed as new and desired to be protected by Letters Patent is set forth in the appended claims.

What is claimed is:

1. A method for utilizing a fishing rod wrapping needle device that has a body portion, a jaw blade major projection extending smoothly from and being collinear with said body portion, said jaw blade major projection having a jaw blade major projection inner surface with a jaw blade major projection inner surface intermediate position, a jaw blade minor projection extending smoothly from and being collinear with said body portion, said jaw blade minor projection having a jaw blade minor projection inner surface with a jaw blade minor projection inner surface intermediate position, said jaw blade minor projection being disposed a distance from and substantially parallel to said jaw blade major projection and defining a jaw blade slot therebetween, a jaw blade major projection paw disposed on and projecting outwardly from said jaw blade major projection inner surface intermediated position, a jaw blade minor projection paw disposed on and projecting outwardly from said jaw blade minor projection inner surface intermediate position and towards said jaw blade major projection paw, said jaw blade major projection and said jaw blade minor projection reversely movable from a first position where said jaw blade minor projection paw contacts said jaw blade major projection paw to a second position where said jaw blade minor projection paw does not contact said jaw blade major projection, comprising the steps of:

a) wrapping a thread initial portion of a thread around a fishing rod at a position adjacent to where an eyelet base of an eyelet is to be placed;

b) positioning said eyelet base on said fishing rod;

c) positioning said fishing rod wrapping needle device adjacent to said fishing rod with said jaw blade assembly positioned in the area of said eyelet base;

d) wrapping a thread remaining portion of said thread around both said eyelet base and said jaw blade assembly;

e) sliding a thread remaining portion end of said thread remaining portion inwardly along said jaw blade slot to the junction of said jaw blade assembly major projection inner surface paw and said jaw blade assembly minor projection inner surface paw;

f) urging said thread remaining portion end towards said needle eye;

g) forcing said jaw blade assembly major projection inner surface paw and said jaw blade assembly minor projection inner surface paw to separate from each other;

h) positioning said thread remaining portion end within said needle eye;

i) moving said fishing rod wrapping needle device in a direction opposite to where said eyelet base is positioned;

j) allowing said fishing rod wrapping needle device to escape from said thread remaining portion;

k) pulling said thread remaining portion end between said fishing rod and said wrapping thread remaining portion;

l) removing thread remaining end from said needle eye; and m) pulling said thread remaining end to securely fasten said eyelet to said fishing rod.

2. The method as defined in claim 1, wherein said sliding step is facilitated by the presence of smoothly tapering sides that taper to a substantially concave surface.

3. The method as defined in claim 1, wherein said forcing step is facilitated by the resiliency of said jaw blade assembly.

* * * * *